US012723523B2

(12) United States Patent
Scialpi et al.

(10) Patent No.: US 12,723,523 B2
(45) Date of Patent: Sep. 1, 2026

(54) CONNECTION ASSEMBLY FOR A GAS TURBINE ENGINE

(71) Applicant: GE Avio S.r.l., Rivalta di Torino (IT)

(72) Inventors: Agostino Scialpi, San Giorgio Ionico (IT); Luca Calianno, Taranto (IT); Alberto Calò, Nardò (IT); Giordano Venuti, Grottaglie (IT); Cristiano Consales, Lecce (IT); Simone Giancane, Monteroni di Lecce (IT); Giacomo Alberto Orsini, Pinerolo (IT)

(73) Assignee: GE Avio S.r.l., Rivalta di Torino (IT)

( * ) Notice: Subject to any disclaimer, the term of this patent is extended or adjusted under 35 U.S.C. 154(b) by 0 days.

(21) Appl. No.: 19/288,069

(22) Filed: Aug. 1, 2025

(65) Prior Publication Data

US 2026/0125991 A1 May 7, 2026

(30) Foreign Application Priority Data

Nov. 7, 2024 (IT) ........................ 102024000025083

(51) Int. Cl.
*F01D 25/24* (2006.01)

(52) U.S. Cl.
CPC ...... *F01D 25/243* (2013.01); *F05D 2220/323* (2013.01); *F05D 2230/60* (2013.01); *F05D 2240/14* (2013.01)

(58) Field of Classification Search
CPC ........ F01D 25/243; F01D 25/28; F01D 5/066; F01D 25/24; F01D 25/265; F01D 11/005; F01D 5/282; F01D 11/006; F01D 21/045; F01D 25/246; F01D 5/026; F01D 5/147; F01D 5/28; F01D 5/3053; F01D 9/023; F01D 9/04; F01D 9/065; F16B 2200/50; F16B 2200/97; F05D 2220/32; F05D 2220/323; F05D 2230/60; F05D 2260/31; F05D 2260/30; F05D 2300/603; F05D 2240/14; F05D 2240/30; F05D 2260/36;
(Continued)

(56) References Cited

U.S. PATENT DOCUMENTS 2,764,266 A 9/1956 Laworth
3,214,201 A * 10/1965 Fonda ..................... F16L 23/02
277/614

(Continued)

FOREIGN PATENT DOCUMENTS

EP 3418492 B1 7/2020

*Primary Examiner* — Eric J Zamora Alvarez
(74) *Attorney, Agent, or Firm* — Hanley, Flight & Zimmerman, LLC

(57) ABSTRACT

A gas turbine engine including a connection assembly. The connection assembly includes a first component of the gas turbine engine defining a first flange. The first component has a first coefficient of thermal expansion. A second component of the gas turbine engine defines a second flange. The second component has a second coefficient of thermal expansion. An adapter includes an adapter body, a first rabbet, and a second rabbet. The adapter may be positioned between the first component and the second component. The adapter has a third coefficient of thermal expansion. The first coefficient of thermal expansion may be greater than the third coefficient of thermal expansion and the third coefficient of thermal expansion may be greater than the second coefficient of thermal expansion.

20 Claims, 9 Drawing Sheets

(58) Field of Classification Search
CPC ..... F05D 2260/941; F16L 23/02; F16L 47/14; F16L 27/1012; F16L 49/04; F02C 7/32; F16D 1/033; F04D 29/023; F04D 29/083; F05B 2260/301
See application file for complete search history.

(56) References Cited

U.S. PATENT DOCUMENTS

| | | | | |
|---|---|---|---|---|
| 3,713,676 | A | 1/1973 | Carlstrom et al. | |
| 5,701,733 | A | 12/1997 | Lewis et al. | |
| 6,283,712 | B1 * | 9/2001 | Dziech | F01D 5/088 415/115 |
| 6,379,108 | B1 | 4/2002 | Schmidt | |
| 6,648,540 | B2 * | 11/2003 | Brisson | F16D 1/033 416/198 A |
| 7,152,411 | B2 | 12/2006 | McCaffrey et al. | |
| 8,079,773 | B2 * | 12/2011 | Blanton | F16L 47/14 403/41 |
| 8,449,260 | B2 * | 5/2013 | Xie | F01D 5/143 416/189 |
| 9,200,520 | B2 * | 12/2015 | Lecuyer | F16D 1/033 |
| 10,677,090 | B2 * | 6/2020 | Sakala | F01D 5/147 |
| 11,802,486 | B2 | 10/2023 | Dunn et al. | |
| 12,000,308 | B2 | 6/2024 | Chaudhari et al. | |
| 2016/0040555 | A1 | 2/2016 | Hayford et al. | |
| 2017/0227152 | A1 | 8/2017 | Tyburcy et al. | |
| 2022/0389837 | A1 | 12/2022 | Menheere | |

* cited by examiner

CONNECTION ASSEMBLY FOR A GAS TURBINE ENGINE

PRIORITY INFORMATION

The present application claims priority to Italian Patent Application Number 102024000025083 filed Nov. 7, 2024.

FIELD

The present disclosure relates to a gas turbine engine.

BACKGROUND

A gas turbine engine generally includes a turbomachine and a rotor assembly. Gas turbine engines, such as turbofan engines, may be used for aircraft propulsion. A gas turbine engine may further include an engine frame and accessories. In some applications, such accessories can be of various sizes.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
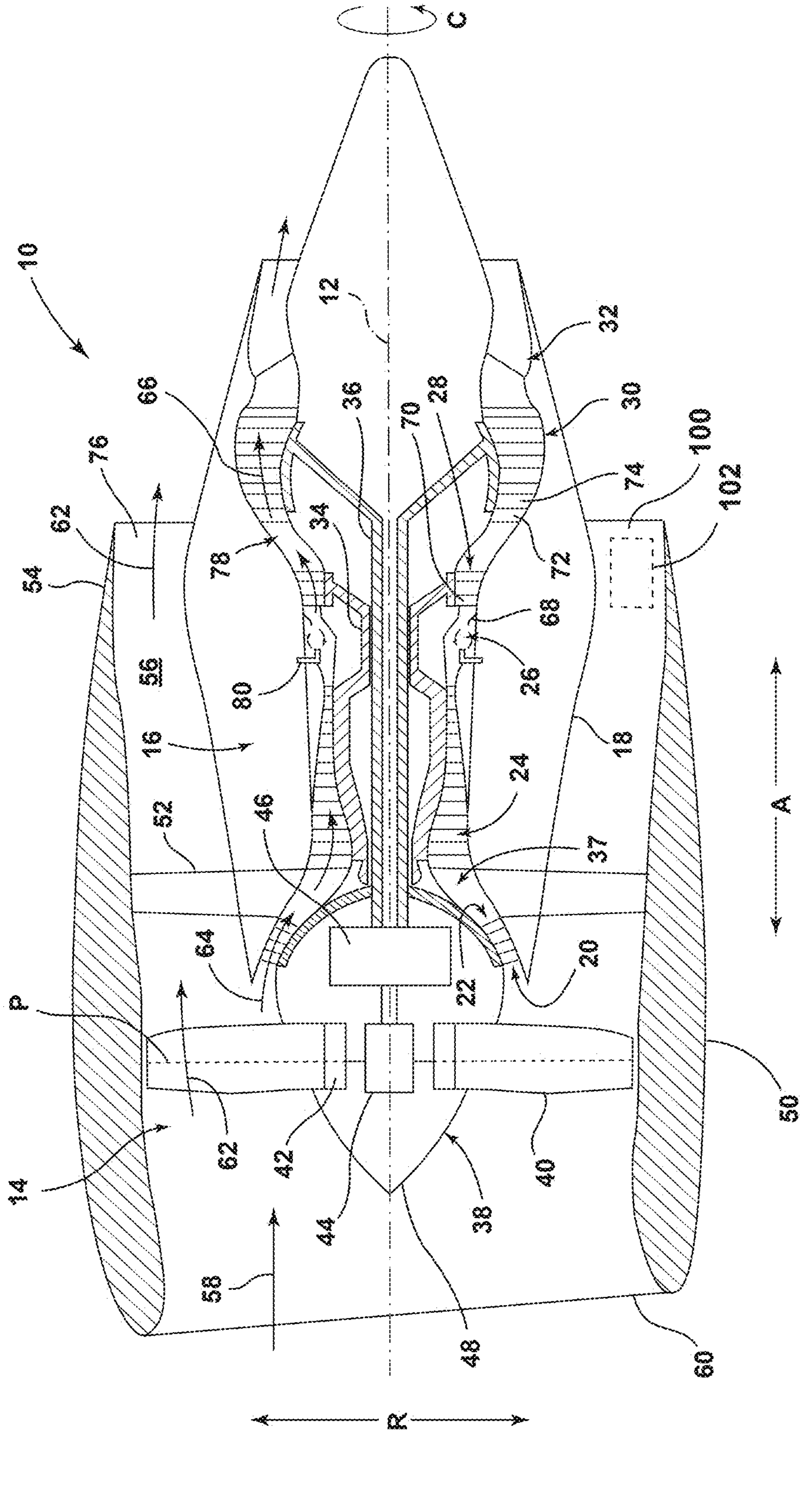
FIG. 1 is a cross-sectional view of a gas turbine engine in accordance with various aspects of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

In this document, relational terms, such as first and second, top and bottom, and the like, are used solely to distinguish one entity or action from another entity or action, without necessarily requiring or implying any actual such relationship or order between such entities or actions. The terms “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by “comprises . . . a” does not, without more constraints, preclude the existence of additional identical elements in the process, method, article, or apparatus that comprises the element. The word “exemplary” is used herein to mean “serving as an example, instance, or illustration.” Any implementation described herein as “exemplary” is not necessarily to be construed as preferred or advantageous over other implementations. Additionally, unless specifically identified otherwise, all embodiments described herein should be considered exemplary.

The singular forms “a”, “an”, and “the” include plural references unless the context clearly dictates otherwise.

The term “at least one of” in the context of, e.g., “at least one of A, B, and C” refers to only A, only B, only C, or any combination of A, B, and C.

The phrases “from X to Y” and “between X and Y” each refers to a range of values inclusive of the endpoints (e.g., refers to a range of values that includes both X and Y).

The term “turbomachine” refers to a machine including one or more compressors, a heat generating section (e.g., a combustion section), and one or more turbines that together generate a torque output.

The term “gas turbine engine” refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term “combustion section” refers to any heat addition system for a turbomachine. For example, the term combustion section may refer to a section including one or more of a deflagrative combustion assembly, a rotating detonation combustion assembly, a pulse detonation combustion assembly, or another appropriate heat addition assembly. In certain example embodiments, the combustion section may include an annular combustor, a can combustor, a cannular combustor, a trapped vortex combustor (TVC), or other appropriate combustion system, or combinations thereof.

An “accessory,” “accessory system,” or “accessory section,” as used herein, refers to any system designed to support a function of the gas turbine engine, which may be self-contained. For example, the accessory system may be an accessory case, a housing for a gear train, a gear train, an accessory gearbox, a generator, a fuel pump, a lubrication pump, an air compressor, a hydraulic pump, an engine starter, etc. The accessory system may further be defined as an auxiliary system. For example, the accessory system may be an auxiliary power unit (APU), a lube oil circulation system, a fuel filtration system, a water injection system, a gas conditioning system, a fogging system, a fuel forwarding system, a fuel delivery system, a utility auxiliary system, a steam injection system, a fluid pumping system, a gas purge system, a power augmentation system, a water wash system, or other appropriate auxiliary system, or combination thereof.

The terms “low” and “high”, or their respective comparative degrees (e.g., -er, where applicable), when used with a compressor, a turbine, a shaft, or spool components, etc. each refer to relative speeds within an engine unless otherwise specified. For example, a “low turbine” or “low speed turbine” defines a component configured to operate at a rotational speed, such as a maximum allowable rotational speed, lower than a “high turbine” or “high speed turbine” of the engine.

The terms “forward” and “aft” refer to relative positions within a gas turbine engine or vehicle, and are based on a normal operational attitude of the gas turbine engine or vehicle. More particularly, forward and aft are used herein with reference to a direction of travel of the vehicle and a direction of propulsive thrust of the gas turbine engine.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A "coefficient of thermal expansion" or "CTE" as used herein refers to the fractional change in the size of a material per unit temperature change. The size of the material may change in terms of either length or volume. The coefficient of thermal expansion may have the unit um/m/° C., ppm/° C., or (inch/inch)/° F. A coefficient of thermal expansion may be used in reference to a variety of materials, such as aluminum, aluminum alloy, titanium, titanium alloy, magnesium, nickel, nickel alloy, steel, steel alloy, any suitable material, and/or a combination thereof.

A "third stream" as used herein means a non-primary air stream capable of increasing fluid energy to produce a minority of total propulsion system thrust. The third stream may generally receive inlet air (air from a ducted passage downstream of a primary fan) instead of freestream air (as the primary fan would). A pressure ratio of the third stream may be higher than that of the primary propulsion stream (e.g., a bypass or propeller-driven propulsion stream). The thrust may be produced through a dedicated nozzle or through mixing of an airflow through the third stream with a primary propulsion stream or a core air stream, e.g., into a common nozzle.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first", "second", and "third" may be used interchangeably to distinguish one component from another and are not intended to signify the location or importance of the individual components.

For purposes of the description hereinafter, the terms "upper", "lower", "right", "left", "vertical", "horizontal", "top", "bottom", "lateral", "longitudinal", and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply embodiments of the disclosure. Hence, specific dimensions and other physical characteristics related to the embodiments disclosed herein are not to be considered as limiting.

As used herein, the terms "integral", "unitary", or "monolithic" as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

The term "unitary" as used herein denotes that the final component has a construction in which the integrated portions are inseparable and is different from a component including a plurality of separate component pieces that have been joined together but remain distinct and the single component is not inseparable (e.g., the pieces may be re-separated). Thus, unitary components may comprise generally substantially continuous pieces of material or may comprise a plurality of portions that are permanently bonded to one another. In any event, the various portions forming a unitary component are integrated with one another such that the unitary component is a single piece with inseparable portions.

The term "segmented" or "segmented arrangement" as used herein describes an arrangement in which the component may not form a continuous arrangement annularly. In this way, a plurality of segments may extend about a centerline 360 degrees, wherein each of the plurality of segments are spaced from one another in an annular direction.

As used herein, the term "complementary" with reference to a radius of curvature of two radii of curvature, refers to the two radii of curvature being equal, or a larger of two the radii of curvature being no more than 10% greater than a smaller of the two radii of curvature.

The term "adjacent" as used herein with reference to two walls and/or surfaces refers to the two walls and/or surfaces contacting one another, or the two walls and/or surfaces being separated only by one or more nonstructural layers and the two walls and/or surfaces and the one or more nonstructural layers being in a serial contact relationship (e.g., a first wall/surface contacting the one or more nonstructural layers, and the one or more nonstructural layers contacting a second wall/surface).

The present disclosure is generally related to a gas turbine engine including an engine frame, structures, gearboxes, accessories, and/or any other component. The engine frame, structures, gearboxes, accessories, and/or any other component may include a connection assembly mechanically coupled to the engine frame, structures, gearboxes, accessories, and/or any other component. The connection assembly may include a first component defining a first flange. The first component may be any one of an engine frame, structures, gearboxes, accessories, and/or any other component. The first component may have a first coefficient of thermal expansion. A second component may define a second flange. The second component may also be any one of an engine frame, structures, gearboxes, accessories, and/or any other component. The second component may have a second coefficient of thermal expansion.

The connection assembly may further include an adapter that includes an adapter body, a first rabbet, and a second rabbet. The adapter may be positioned between the first component and the second component. The adapter may have a third coefficient of thermal expansion. In various instances, the first coefficient of thermal expansion may be greater than the third coefficient of expansion. Additionally or alternatively, the third coefficient of expansion may be greater than the second coefficient of expansion.

Moreover, the connection assembly may further include a fastener. The fastener may be configured to retain the first component, the adapter, and the second component relative to one another along a connection assembly centerline.

The present disclosure also generally relates to a method of retaining a connection assembly. The method may include increasing a temperature of a connection assembly. The connection assembly includes a first component defining a first flange, the first component having a first coefficient of thermal expansion, and a second component defining a second flange, the second component having a second coefficient of thermal expansion; imparting a radially outward force through expansion of the first flange onto an adapter through a first rabbet, the adapter having a third coefficient of thermal expansion, wherein the first coefficient of thermal expansion is greater than the third coefficient of thermal expansion; and transferring at least a portion of the radially outward force to the second flange via the adapter and a second rabbet, wherein the third coefficient of thermal expansion is greater than the second coefficient of thermal expansion.

In some cases, the adapter may be shaped to mitigate sliding and material stress between the first flange and the second flange while the gas turbine engine is in operation and/or at any other time. For example, during the operation of one or more components of the gas turbine engine, various materials within the gas turbine engine may increase in temperature. In such examples, a first component may be formed from a first material and/or a first combination of materials and a second component may be formed from a second material and/or a second combination of materials. The first material and/or the first combination of materials may be different from the second material and/or the second combination of materials Due to the material differences within each of the components, the first component and the second component may slide relative to one another when heated since the first component and the second component may expand in accordance with the varying coefficients of thermal expansion. In some cases, the second component may include a rabbet to allow the components to be aligned. However, the thermal expansion of each of the components at different rates and to different sizes may lead to the development of material stress between each of the components, particularly on the rabbet of the second component. In other cases, sliding may be caused by an unfavorable temperature gradient, as the first component or the second component may be heated to a higher degree, thus resulting in an uneven expansion in the connection assembly. Further, a significant amount of radial force may be transferred between the first component and the second component in various arrangements, such as through a stiff rabbet connection. Such arrangements may lead to overstressing at least one of the components in some cases. Further, in the case in which the first component and the second component are mechanically coupled to one another without a rabbet, significant sliding and fastener overstress may be induced upon a fastener. As such, the adapter provided herein may mitigate these issues.

Referring now to the drawings, wherein identical numerals indicate the same elements throughout the figures, FIG. 1 is a schematic cross-sectional view of a gas turbine engine in accordance with an embodiment of the present disclosure. More particularly, for the embodiment of FIG. 1, the gas turbine engine is a high-bypass turbofan jet engine, sometimes also referred to as a "turbofan engine." As shown in FIG. 1, the gas turbine engine 10 defines an engine axial direction A1 (extending parallel to a longitudinal centerline 12 provided for reference), an engine radial direction R1, and an engine circumferential direction C1 extending about the longitudinal centerline 12. In general, the gas turbine engine 10 includes a fan section 14 and a turbomachine 16 disposed downstream of the fan section 14.

The turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft 34 (which may additionally or alternatively be a spool) drivingly connects the HP turbine 28 to the HP compressor 24. A low pressure (LP) shaft 36 (which may additionally or alternatively be a spool) drivingly connects the LP turbine 30 to the LP compressor 22. The compressor section, a combustion section 26, the turbine section, and the jet exhaust nozzle section 32 together define a working gas flowpath 37.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R1. Each fan blade 40 is rotatable relative to the disk 42 about a pitch axis P by virtue of the fan blades 40 being operatively coupled to a suitable pitch change mechanism 44 configured to collectively vary the pitch of the fan blades 40, e.g., in unison. The gas turbine engine 10 further includes a power gearbox 46, and the fan blades 40, disk 42, and pitch change mechanism 44 are together rotatable about the longitudinal centerline 12 by LP shaft 36 across the power gearbox 46. The power gearbox 46 includes a plurality of gears for adjusting the rotational speed of the fan 38 relative to a rotational speed of the LP shaft 36, such that the fan 38 may rotate at a more efficient fan speed.

Referring still to the embodiment of FIG. 1, the disk 42 is covered by rotatable front hub 48 of the fan section 14 (sometimes also referred to as a "spinner"). The front hub 48 is aerodynamically contoured to promote an airflow through the plurality of fan blades 40.

Additionally, the fan section 14 includes an annular fan casing or outer nacelle 50 that circumferentially surrounds the fan 38 and/or at least a portion of the turbomachine 16. It should be appreciated that the outer nacelle 50 is supported relative to the turbomachine 16 by a plurality of circumferentially-spaced outlet guide vanes 52 in the embodiment depicted. Moreover, a downstream section 54 of the outer nacelle 50 extends over an outer portion of the turbomachine 16 so as to define a bypass airflow passage 56 therebetween.

During the operation of the gas turbine engine 10, a volume of air 58 enters the gas turbine engine 10 through an associated inlet 60 of the outer nacelle 50 and fan section 14. As the volume of air 58 passes across the fan blades 40, a first portion of air 62 is directed or routed into the bypass airflow passage 56, and a second portion of air 64 as indicated by arrow 64 is directed or routed into the working gas flowpath 37, or more specifically into the LP compressor 22. The ratio between the first portion of air 62 and the second portion of air 64 is commonly known as a bypass ratio. A pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the turbomachine 16.

Additionally, the gas turbine engine 10 may define an engine frame 100. For example, the engine frame 100 may be defined as any part of the gas turbine engine that provides structural stability. Moreover, the engine frame 100 may be defined as the outer casing 18, outer nacelle 50, or any other suitable portion of the engine providing structural support for the components within the gas turbine engine 10.

Moreover, the gas turbine engine 10 may further include at least one accessory system 102. At least one accessory system 102 may be coupled to any suitable portion of the gas turbine engine 10. For example, the accessory system 102 may be mechanically coupled, fluidly coupled, or coupled via any suitable means to any portion of the gas turbine engine 10. In some cases, the accessory system 102 may be coupled via a connection assembly to at least one portion of the gas turbine engine 10 suitable for providing stability to the accessory system 102. Further, the accessory system 102 may be a sump assembly, gearbox assembly, accessory gear train, hydraulic pump assembly, or any suitable accessory system 102 necessary for the control and operation of the gas turbine engine 10.

The gas turbine engine 10 depicted in FIG. 1 is by way of example only, and in other embodiments, the gas turbine engine 10 may have any other suitable configuration. For example, although the gas turbine engine 10 depicted is configured as a ducted gas turbine engine (e.g., including the outer nacelle 50), in other embodiments, the gas turbine engine 10 may be an unducted gas turbine engine (such that the fan 38 is an unducted fan, and the outlet guide vanes 52 are cantilevered from the outer casing 18). Additionally, or alternatively, although the gas turbine engine 10 depicted is configured as a geared gas turbine engine (e.g., including the power gearbox 46) and a variable pitch gas turbine engine (e.g., including a fan 38 configured as a variable pitch fan), in other embodiments, the gas turbine engine 10 may additionally or alternatively be configured as a direct drive gas turbine engine (such that the LP shaft 36 rotates at the same speed as the fan 38), as a fixed pitch gas turbine engine (such that the fan 38 includes fan blades 40 that are not rotatable about a pitch axis P), or both. It should also be appreciated that in still other embodiments, aspects of the present disclosure may be incorporated into any other suitable gas turbine engine. For example, in other embodiments, aspects of the present disclosure may (as appropriate) be incorporated into, e.g., a turboprop gas turbine engine, a turboshaft gas turbine engine, or a turbojet gas turbine engine.

As will be appreciated from the description herein, various embodiments of a gas turbine engine 10 are provided. Certain of these embodiments may be an unducted, single-rotor gas turbine engine, or a ducted turbofan engine. Various additional aspects of one or more of these embodiments are discussed below. These aspects may be combined with one or more of the gas turbine engine(s) discussed above with respect to the figures.

Figure 2A:
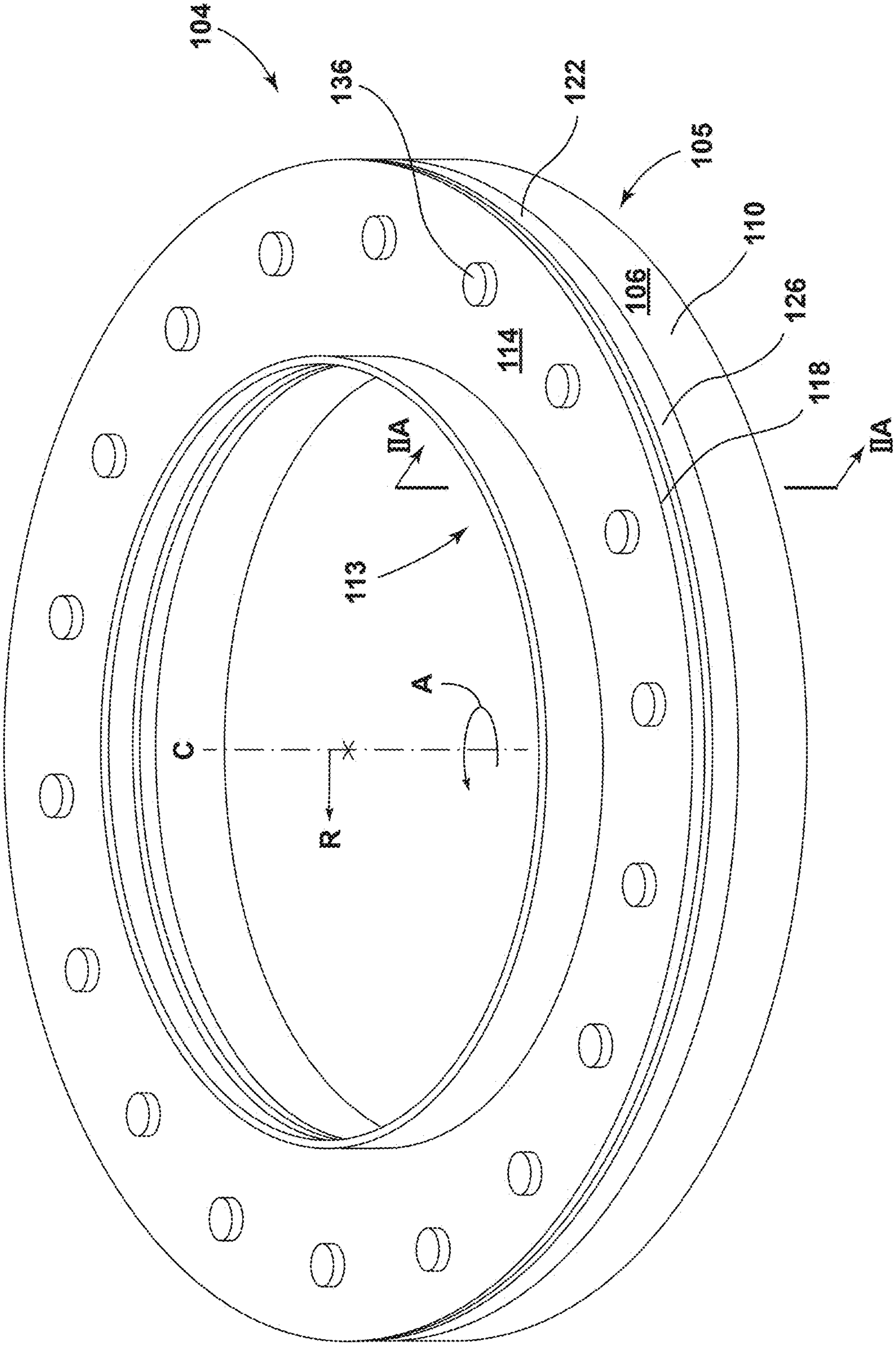
FIG. 2A is a perspective view of a connection assembly in accordance with various aspects of the present disclosure.
Figure 2B:
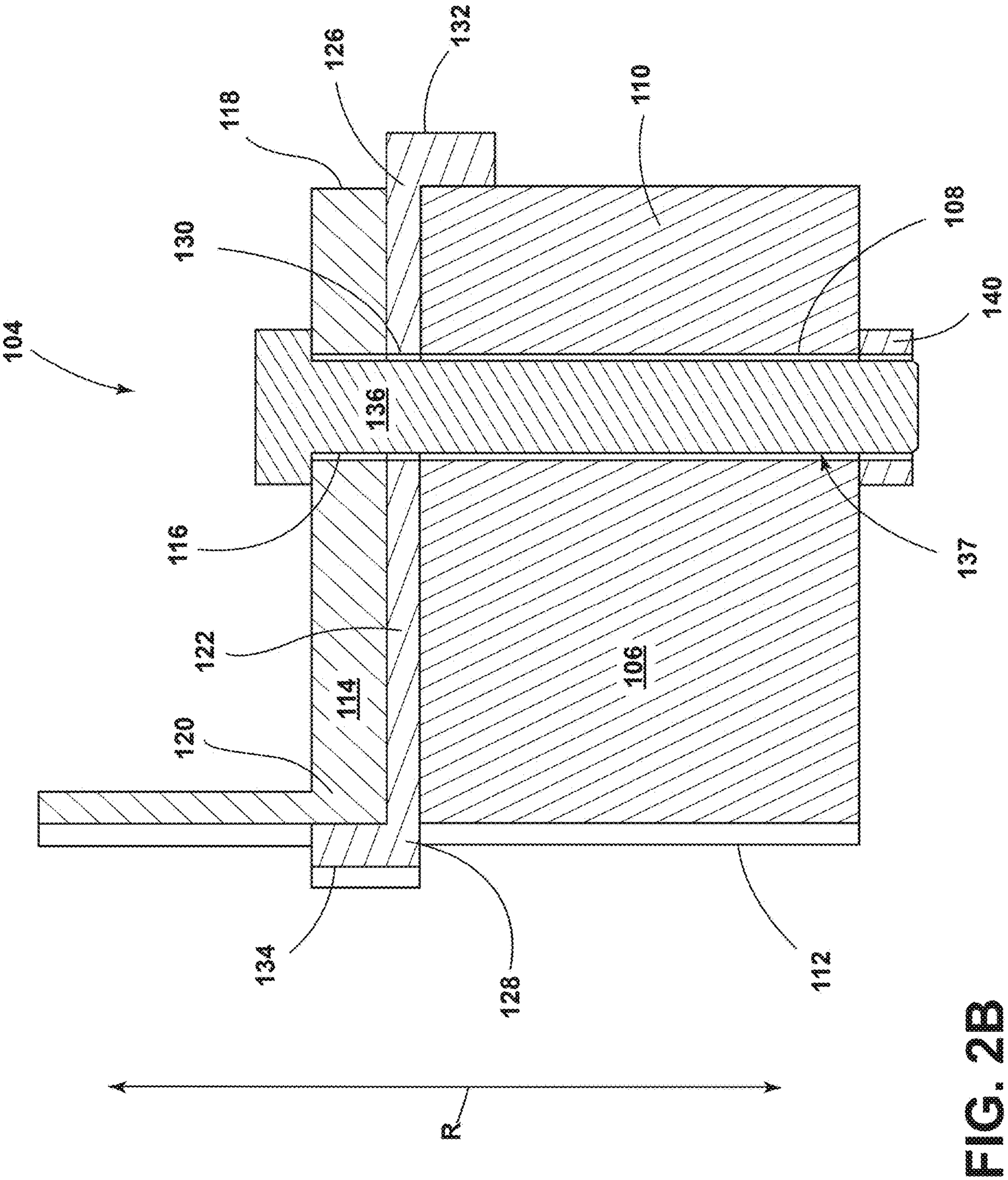
FIG. 2B is a cross-sectional view of the connection assembly taken across line IIA-IIA of FIG. 2A in accordance with various aspects of the present disclosure.

Referring now to FIGS. 2A and 2B, a perspective view and a cross-sectional view of a connection assembly 104 are respectively illustrated in accordance with various aspects of the present disclosure. As noted above, the connection assembly 104 may be configured to connect at least one accessory system 102 to at least a portion of the gas turbine engine 10. For example, the connection assembly 104 may be utilized to connect the accessory system 102 to a portion of the engine frame 100 to retain the accessory system 102 components in a defined position. For example, the connection assembly 104 may be utilized to retain a gearbox in a defined position or to connect the accessory system 102 to a gearbox. In some cases, the connection assembly 104 may be used at any suitable location within the gas turbine engine 10 to couple any suitable components to one another.

With further reference to FIGS. 2A and 2B, a connection assembly centerline C may be defined as extending axially along the connection assembly 104. An annular direction A may be defined about the connection assembly centerline C. A radial direction R extends from the connection assembly centerline C. For example, one or more components of the connection assembly 104 may extend annularly about the connection assembly centerline C in such a way as to form a ring-like configuration.

Referring still to FIGS. 2A and 2B, the connection assembly 104 may include a first component 105 defining a first flange 106. The first flange 106 may define a portion of any suitable component of the gas turbine engine 10. For example, the first flange 106 may define a portion of the engine frame 100, a portion of the accessory system 102, or any suitable engine structural component. Moreover, the first flange 106 may define a generally annular shape extending about the connection assembly centerline C in the annular direction. In some cases, the first flange 106 may define an outer diameter of at least 10 centimeters to at most 6 meters, or any suitable diameter.

Further, the first flange 106 may define at least one hole 108 extending through at least a portion of the first flange 106. For example, the first flange 106 may define a plurality of holes 108 through the first flange 106 that are spaced along the annular direction of the first flange 106. Each of the plurality of holes 108 through the first flange 106 may be spaced uniformly about the connection assembly centerline C in the annular direction. In other cases, each of the plurality of holes 108 through the first flange 106 may be spaced non-uniformly in the annular direction A. Generally, the plurality of holes 108 through the first flange 106 may be spaced in any suitable manner along the annular direction A on the surface of the first flange 106. Additionally, each of the plurality of holes 108 through the first flange 106 may extend through a defined distance into the first component 105. For example, each of the plurality of holes 108 through the first component 105 may extend the same length through the first component 105 as one another. In other cases, the plurality of holes 108 through the first flange 106 may each extend different lengths into the first component 105. Alternatively, the plurality of holes 108 through the first flange 106 may extend through the entirety of the first component 105. In various cases, the plurality of holes 108 through the first flange 106 may extend any suitable length through the first component 105 to support the connection assembly 104.

Additionally, the plurality of holes 108 through the first flange 106 may include any suitable number of holes 108. For example, the plurality of holes 108 through the first flange 106 may make up at least one hole and up to twenty holes. In other cases, the plurality of holes 108 through the first flange 106 may be up to fifty holes. In various cases, the plurality of holes 108 through the first flange 106 may make up any suitable number of holes necessary for the operation of the connection assembly 104.

Moreover, each of the plurality of holes 108 through the first flange 106 may have a defined diameter. For example, each of the plurality of holes 108 through the first flange 106 may have a diameter based on the components coupled through the connection assembly 104. For instance, each of the plurality of holes 108 through the first flange 106 may have a diameter configured to receive any suitable fastener (e.g., nut, pin, stud, or any other fastener, mechanical, chemical, or otherwise).

With further reference to FIGS. 2A and 2B, the first flange 106 may define a first portion 110 and a second portion 112. Generally, the first portion 110 may be radially outward of the second portion 112. For example, the first portion 110 may be defined as the radially outward most portion of the first flange 106. The second portion 112 may be defined as the radially inward most portion of the first flange 106.

In various cases, the first component 105 may have a first coefficient of thermal expansion as determined by the material that makes up the first component 105, and, consequently, the first flange 106. For example, the first component 105 may have a coefficient of thermal expansion associated with an aluminum alloy, magnesium, titanium, or any other suitable material for the connection assembly 104. For instance, the first component 105 may be made up of aluminum or magnesium. In various cases, the first component 105 may have a coefficient of thermal expansion that may range from 0.8E-5 ((inch/inch)/° F.) to 2.6E-5 ((inch/inch)/° F.), or any suitable value.

Referring still to FIGS. 2A and 2B, the connection assembly 104 may further include a second component 113 defining a second flange 114. The second flange 114 may define a portion of any suitable component of the gas turbine engine 10. For example, the second flange 114 may define a portion of the engine frame 100, a portion of the accessory system 102, or any suitable engine structural component. Moreover, the second flange 114 may define a generally annular shape extending about the connection assembly centerline C in the annular direction A. In various cases, the second flange 114 may define an outer diameter from at least 10 centimeters to at most 6 meters, or any suitable diameter.

Moreover, the second flange 114 may define at least one hole 116 extending therethrough. In some cases, the second flange 114 may define a plurality of holes 116 through the second flange 114 spaced along the annular direction A of the second flange 114. Each of the plurality of holes 116 of the second flange 114 may be spaced uniformly about the connection assembly centerline C in the annular direction A. In other cases, each of the plurality of holes 116 through the second flange 114 may be spaced non-uniformly in the annular direction A. Generally, the plurality of holes 116 through the second flange 114 may be spaced in any suitable manner along the annular direction A on the surface of the second flange 114. In some cases, the plurality of holes 116 through the second flange 114 may have spacing that is the same as the plurality of holes 116 through the first flange 106.

Additionally, the second flange 114 may define any number of holes. For example, the second flange 114 may define at least one hole and up to fifty holes, or up to any other suitable number of holes. Further, the number of holes forming the plurality of holes 116 defined by the second flange 114 may be equal to the number of holes forming the plurality of holes 108 through the first flange 106. In other cases, the number of holes forming the plurality of holes 116 defined by the second flange 114 may be a different number from the number of holes forming the plurality of holes 108 through the first flange 106.

Moreover, each of the plurality of holes 116 through the second flange 114 may have a defined diameter. For example, each of the plurality of holes 116 through the second flange 114 may have a diameter based on the components coupled through the connection assembly 104. For instance, each of the plurality of holes 116 through the second flange 114 may have a diameter configured to receive any suitable fastener (e.g., nut, pin, stud, or any other fastener, mechanical, chemical, or otherwise). For example, each of the plurality of holes 116 through the second flange 114 may have a diameter that ranges from 1 millimeter to 100 centimeters. Particularly, the diameter of each of the plurality of holes 116 through the second flange 114 may have the same diameter as the plurality of holes 108 through the first flange 106.

Further, the second flange 114 may have a first segment 118 and a second segment 120. Generally, the first segment 118 may be radially outward of the second segment 120. For example, the first segment 118 may be defined as the radially outward most portion of the second flange 114. The second segment 120 may be defined as the radially inward most portion of the second flange 114.

In various cases, the second component 113, and, consequently, the second flange 114, may have a second coefficient of thermal expansion as determined by the material that makes up the second component 113. For example, the second component 113 may have a second coefficient of thermal expansion associated with an aluminum alloy, magnesium, titanium, or any other suitable material for the connection assembly 104. For instance, the second component 113 may be made up of titanium or nickel alloy. In some cases, the second component 113 may be made up of the same material as the first component 105. In various examples, the first coefficient of thermal expansion may be greater than the second coefficient of thermal expansion. Moreover, the second component 113 may have a second coefficient of thermal expansion that is at least 0.3E-5 ((inch/inch)/° F.) to at most 1.2E-5 ((inch/inch)/° F.) or any suitable value.

In some cases, the connection assembly 104 may further include an adapter 122 positioned between the first flange 106 and the second flange 114. For instance, the adapter 122 may be shaped to mitigate sliding and material stress between the first flange 106 and the second flange 114 while the gas turbine engine 10 is in operation and/or at any other time. In some cases, during the operation of one or more components of the gas turbine engine 10, various materials within the gas turbine engine 10 may increase in temperature. Moreover, a first component 105 may be formed from a first material and/or a first combination of materials and a second component 113 may be formed from a second material and/or a second combination of materials. The first material and/or the first combination of materials may be different from the second material and/or the second combination of materials. Due to the material differences within each of the components, the first component 105 and the second component 113 may slide relative to one another when heated since the first component 105 and the second component 113 expand in accordance with the varying coefficients of thermal expansion. In some cases, particularly those in which the first component 105 and the second component 113 are mechanically coupled to one another, the second component 113 may include a rabbet to allow the components to be aligned. In such cases, the thermal expansion of each of the components at different rates and to different sizes may lead to the development of material stress between each of the components, particularly on the rabbet configuration of the second component. In other cases, sliding may be caused by an unfavorable temperature gradient, as the first component 105 or the second component 113 may be heated to a higher degree, thus resulting in an uneven expansion in the connection assembly 104. Further, an amount of radial force may be transferred between the first component and the second component in various arrangements, such as through a stiff rabbet connection. Such arrangements may lead to overstressing at least one of the components. Further, in the case in which the first component 105 and the second component 113 are mechanically coupled to one another without a rabbet, significant sliding and fastener overstress may be induced upon a fastener 136.

The adapter 122 may be formed from a third material and/or a third combination of materials and have a third coefficient of thermal expansion. The third coefficient of thermal expansion may be a value that falls between the first coefficient of thermal expansion and the second coefficient of thermal expansion, which may mitigate the sliding of the first component 105 relative to the second component 113, or vice versa when one or more components of the connection assembly 104 increases in temperature. Further, the adapter 122 may reduce stresses within each of the components of the connection assembly 104, particularly stresses occurring proximate to the plurality of holes 108, 116, 130 of each of the components and/or in the region between the first portion 110 of the first flange 106 and the adapter 122, and/or in the region between the second segment 120 of the second flange 114 and the adapter 122.

In various examples, the adapter 122 may be positioned between the first flange 106 and the second flange 114. For example, the adapter 122 may separate at least a portion of the first flange 106 from at least a portion of the second flange 114. Further, the adapter 122 may define a generally annular shape extending about the connection assembly centerline C in the annular direction A. In several examples, the adapter 122 may generally define an outer diameter that may configure the adapter 122 to extend outward of the first portion 110 and/or the first segment 118 from the connection assembly centerline C. Additionally or alternatively, the adapter 122 may define an inner diameter. The inner diameter may be sized such that the adapter 122 may be positioned inward of the second section 128 and/or the second segment 120 from the connection assembly centerline C. In some cases, the adapter 122 may define an outer diameter of at least 5 centimeters and at most up to 6.5 meters. In other cases, the adapter 122 may define an outer diameter of at least, or any suitable diameter.

Figure 3:
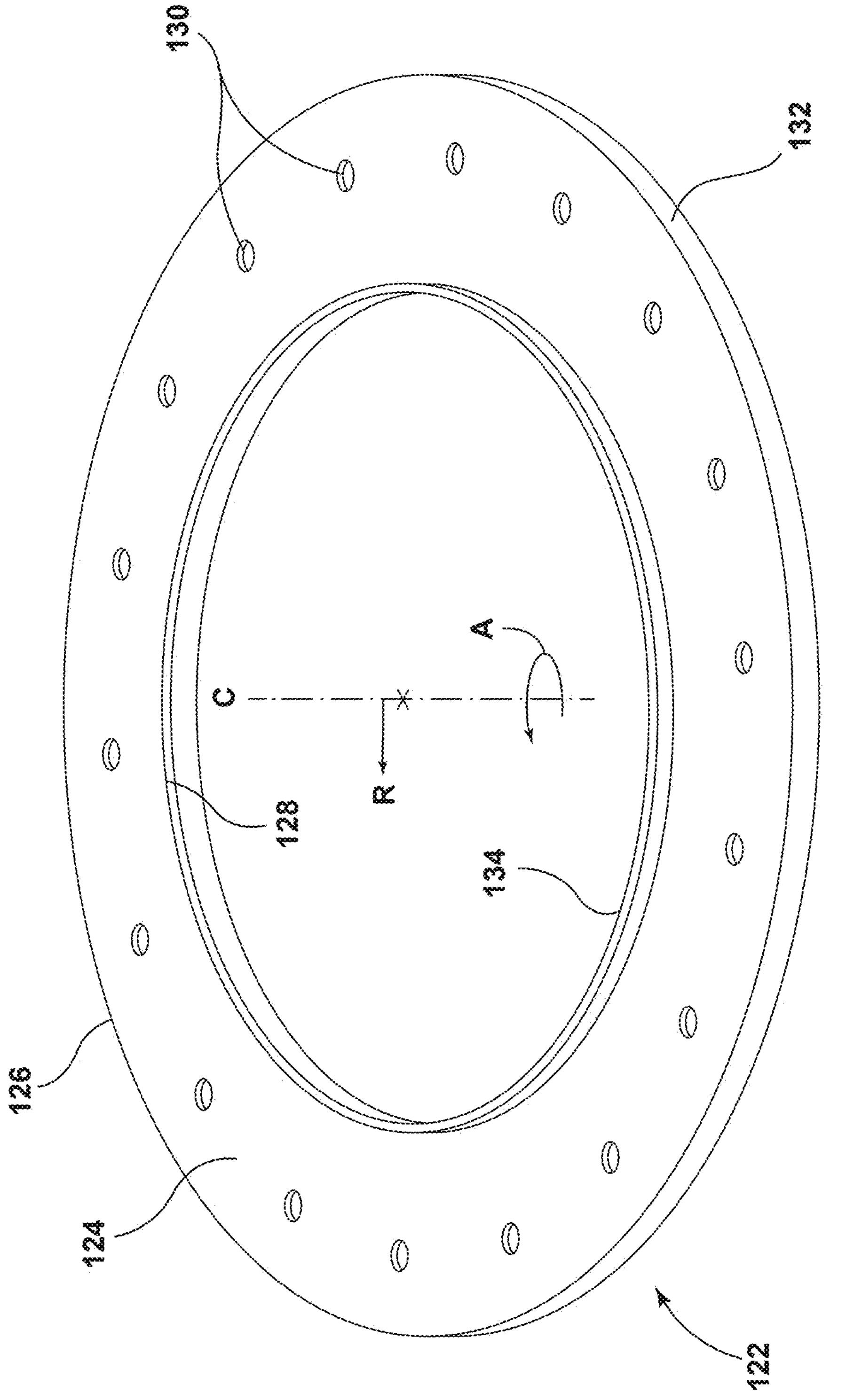
FIG. 3 is a perspective view of an adapter in accordance with various aspects of the present disclosure.

Referring now to FIG. 3, a perspective view of an adapter 122 in accordance with various aspects of the present disclosure is illustrated. As noted above, the adapter 122 may define a generally annular shape extending about the connection assembly centerline C. In other cases, the adapter 122 may not extend annularly completely about the connection assembly centerline C, such as less than 360 degrees about the connection assembly centerline C. Additionally, the adapter 122 may define an adapter body 124. The adapter body 124 is defined as the portion of the adapter 122 separating the first flange 106 from the second flange 114. The adapter body 124 may have any suitable thickness. In various cases, the adapter body 124 may have a thickness ranging from 1 millimeter to 100 centimeters.

Further, the adapter body 124 may further define a first section 126 and a second section 128. Generally, the first section 126 may be radially outward of the second section 128. For example, the first section 126 may be defined as the radially outward most portion of the adapter 122. The second section 128 may be defined as the radially inward most portion of the adapter 122.

Further, the adapter 122 may further define at least one hole 130 extending through the entirety of the adapter body 124. In some cases, the adapter 122 may have a plurality of holes 130 through the adapter 122 spaced along the annular direction A of the adapter body 124. Each of the plurality of holes 130 through the adapter 122 may be spaced uniformly about the connection assembly centerline C in the annular direction A on the surface of the adapter body 124. In other cases, the plurality of holes 130 through the adapter 122 may be spaced non-uniformly in the annular direction A. Generally, the plurality of holes 130 through the adapter 122 may be spaced in any suitable manner along the annular direction A on the surface of the adapter body 124. Particularly, the plurality of holes 130 through the adapter 122 may have spacing that is the same as the plurality of holes 108 through the first flange 106 and the plurality of holes 116 through the second flange 114.

Additionally, the plurality of holes 130 through the adapter body 124 may make up any suitable number of holes. For example, the adapter body 124 may have at least one hole and up to twenty holes. In other cases, the plurality of holes 130 through the adapter 122 may be up to fifty holes. In various cases, the plurality of holes 130 through the adapter body 124 may be any suitable number of holes. Further, the plurality of holes 130 defined by the adapter 122 may be equal to the plurality of holes 108 through the first flange 106 and the plurality of holes 116 through the second flange 114. In other cases, the adapter 122 may define a different number of holes than the first flange 106 and/or the second flange 114.

Moreover, each of the plurality of holes 130 through the adapter 122 may have a defined diameter. In several examples, each of the plurality of holes 130 through the adapter 122 may have a diameter configured to receive any suitable fastener (e.g., nut, pin, stud, or any other fastener, mechanical, chemical, or otherwise). In various examples, the diameter of each of the plurality of holes 130 through the adapter 122 may have the same diameter as each of the plurality of holes 108 through the first flange 106 and the plurality of holes 116 through the second flange 114.

In some cases, the adapter 122 may be configured in a hook configuration rather than having a plurality of holes 130 through the adapter. For example, the hook configuration may include a plurality of radially inward extending cutouts extending a length from the outermost surface of the adapter body 124. In this way, the adapter may be non-continuous in the annular direction. A. In various cases, the cutouts may extend any suitable length from the outer circumferential surface of the adapter, such as at least 5 centimeters to at most 500 centimeters. Further, the plurality of cutouts may have a similar spacing as that described above for the arrangement of the adapter having the plurality of holes through the adapter.

In some examples, the adapter 122 may further include a first rabbet 132. The first rabbet 132 may extend orthogonally from the adapter body 124 in a first direction. For example, the first rabbet 132 may be integral with the first section 126 of the adapter body 124 and configured to form a unitary component with the adapter body 124. The first rabbet 132 may extend orthogonally for any suitable length. In some cases, the first rabbet 132 may extend at least 1 millimeter to at most 100 centimeters, or any suitable length to ensure the structural integrity of the connection assembly 104. The first rabbet 132 may contact the first portion 110. For example, the first rabbet 132 may extend along at least a portion of the first portion 110.

Additionally, or alternatively, the adapter 122 may include a second rabbet 134. The second rabbet 134 may extend orthogonally from the adapter body 124 in a second direction. The second direction may be opposite to that of the first direction. For example, the second rabbet 134 may be integral with the second section 128 of the adapter body 124 and configured to form a unitary component with the adapter body 124. The second rabbet 134 may extend orthogonally for any suitable length. In some cases, the second rabbet 134 may extend at least 1 millimeter to at most 100 centimeters, or any suitable length to ensure the structural integrity of the connection assembly 104. In some cases, the first rabbet 132 and the second rabbet 134 may extend to the same length. In other cases, the first rabbet 132 and the second rabbet 134 may extend to different lengths. The second rabbet 134 may contact the second segment 120. For example, the second rabbet 134 may extend along at least a portion of the second segment 120 in such a way that the thickness of the second rabbet 134 may extend radially inward from the surface of the second segment 120.

The first rabbet 132 and the second rabbet 134 may have substantially the same thickness as that of the adapter body 124 extending out from the first portion 110 of the first flange 106 and the second segment 120 of the second flange 114, respectively. Alternatively, the first rabbet 132 thickness and the second rabbet 134 thickness may be the same, while the adapter body 124 may define a different thickness. In other cases, the first rabbet 132, the second rabbet 134, and the adapter body 124 may each have different thicknesses. In some cases, the first rabbet 132 may have a thickness of at least 1 millimeter to at most 20 centimeters, or any suitable thickness to ensure the structural integrity of the connection assembly 104. Further, the second rabbet 134 may have a thickness of at least 1 millimeter to at most 20 centimeters, or any suitable thickness to ensure the structural integrity of the connection assembly 104.

In various cases, the adapter 122 may have a third coefficient of thermal expansion as determined by the material that may make up the adapter. For example, the adapter may have a coefficient of thermal expansion associated with an aluminum alloy, magnesium, titanium, or any other suitable material for the connection assembly 104. For instance, the adapter 122 may be made up of steel or nickel alloy. In some cases, the first coefficient of thermal expansion may be greater than the third coefficient of thermal expansion. Additionally or alternatively, the third coefficient of thermal expansion may be greater than the second coefficient of thermal expansion. Moreover, the adapter may have a coefficient of thermal expansion that is at 0.5E-5 ((inch/inch)/° F.) to at most 2.3 E-5 ((inch/inch)/° F.), or any suitable value to ensure the structural integrity of the connection assembly 104.

Referring back to FIGS. 2A and 2B, the connection assembly 104 may further include at least one of the fasteners 136. As depicted, the plurality of fasteners 136 may extend through the connection assembly 104 through the plurality of holes 108, 116, 130 defined by the first flange 106, the second flange 114, and the adapter 122, respectively. As such, the fastener 136 may define any diameter suitable for the connection assembly 104. The fastener 136 may be a bolt, a pin, a stud, or any suitable fastening device. Further, the at least one fastener 136 may be held in place by a retainer 140 (e.g., nut, pin, stud, or any other fastener, mechanical, chemical, or otherwise) configured to retain the fastener 136 in place.

The connection assembly 104 may have at least one fastener 136 and up to twenty fasteners. In some cases, the connection assembly 104 may have up to fifty fasteners. In various cases, the connection assembly 104 may have any suitable number of fasteners for the operation of the connection assembly 104. For example, the connection assembly 104 may have substantially the same number of fasteners 136 are there are holes 108, 116, 130 defined by the first flange 106, the second flange 114, and the adapter 122, respectively. In some examples, the plurality of holes 108, 116, 130 defined by the first flange 106, the second flange 114, and the adapter 122 to form a fastener channel 137 are aligned.

During operation, the heat from the operation of the gas turbine engine 10 and the associated components of accessory system 102 may increase a temperature of the connection assembly 104. In doing so, the first flange 106 may be heated and, thus, expand in accordance with the first coefficient of thermal expansion. While expanding, the first flange 106 may push into the first rabbet 132 of the adapter 122. As the first coefficient of thermal expansion is greater than the third coefficient of expansion, the first flange 106 may expand more than the adapter 122. As such, the first rabbet 132 may impart a radially inward force upon the first flange 106, and thus the first flange 106 may impart a radially outward force upon the adapter 122. As used herein, "radially inward" refers to a direction from an outer circumference of the adapter 122, the first component 105, or the second component 113 towards the connection assembly centerline C. Conversely, "radially outward" refers to a direction from the connection assembly centerline C towards an outer circumference of the adapter 122, the first component 105, or the second component 113.

As the adapter 122 is heated, the adapter 122 may expand in accordance with the third coefficient of thermal expansion, and the second flange 114 may be heated and thus expand in accordance with the second coefficient of thermal expansion. The adapter 122 may expand more than the second flange 114. At least a portion of the radially outward force imposed by the expansion of the first flange 106 imparted upon the adapter 122 is thus transferred to the second flange 114 through the second rabbet 134. In this way, the radially outward force is split into two portions, the force between the first rabbet 132 and the first component 105, and the force between the second rabbet 134 and the second component 113. Additionally, the expansion of the adapter 122 at a third coefficient of thermal expansion with a value between that of the first coefficient of thermal expansion and the second coefficient of thermal expansion may allow for the transferred force to be reduced. As such, the stresses on each of the first flange 106 and the second flange 114 may be reduced. The adapter 122, through the second rabbet 134, imposes a radially outward force upon the second flange 114, and thus the second flange 114 imposes a radially inward force upon the second rabbet 134 and thus the adapter 122. Through the heating and subsequent expansion of the connection assembly 104, the force from each of the first flange 106 and the second flange 114 is transferred and split via the adapter 122 and respective rabbets 132, 134.

Moreover, during operation, the connection assembly 104 may experience stress occurring in the region of the fastener 136. Particularly, the stress may occur in the region between the first rabbet 132 and/or second rabbet 134 of the adapter 122 and the fastener 136 during the heating of the connection assembly 104. As a result, stress may also occur on the fastener 136 itself due to sliding that may occur between the first component 105 and the second component 113. As such, the expansion of the adapter 122 with the expansion of the first component 105 and the second component 113 may mitigate the stress occurring in the region of the fastener 136. As such, the stress occurring on the fastener 136 itself through the expansion of the first flange 106 and the second flange 114 may also be mitigated using the adapter 122 by reducing the sliding between the first component 105 and the second component 113. For instance, as the adapter 122 has a third coefficient of thermal expansion with a value between the first coefficient of thermal expansion of the first component 105 and the second coefficient of thermal expansion of the second component 113, the stress imposed upon the region between the first rabbet 132 and/or second rabbet 134 and the fastener 136 extending through the connection assembly 104 is reduced. This may be useful in applications involving aluminum, aluminum alloys, magnesium, and/or any combination of materials.

Figure 4:
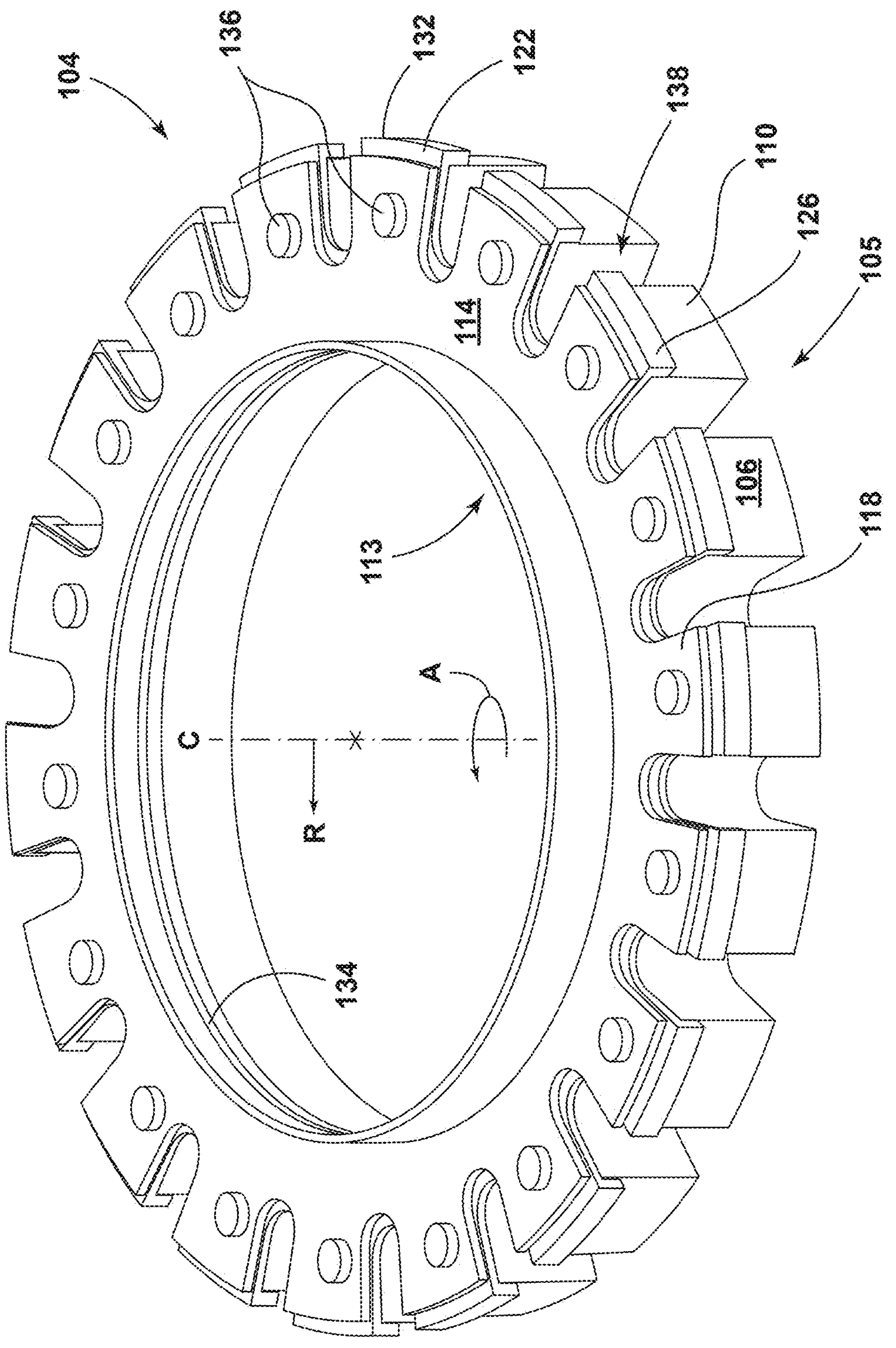
FIG. 4 is a perspective view of a connection assembly in accordance with various aspects of the present disclosure.

Referring now to FIG. 4, a perspective view of the connection assembly 104 in accordance with various aspects of the present disclosure is illustrated. As illustrated, the adapter 122, the first component 105, and the second component 113 each define a scalloped configuration. As used herein, a scalloped configuration may be defined as a plurality of cutouts 138, such as a U-shaped cutout, from a body. In some examples, the plurality of cutouts 138 may extend radially inward from the first section 126 of the adapter 122, the first portion 110 of the first component 105, and/or the first segment 118 of the second component 113. The scalloped configuration may extend about the entirety of the circumference of the adapter 122, the first component 105, and/or the second component 113. Further, the plurality of cutouts 138 may extend radially inward in the spaces between each of the plurality of holes 130 through the adapter, the plurality of holes 108 through the first component 105, and/or the plurality of holes 116 through the second component 113. Moreover, each of the scalloped configurations of each of the adapter 122, the first component 105, and the second component 113 may be aligned and in contact with one another along the connection assembly centerline C.

Figure 5:
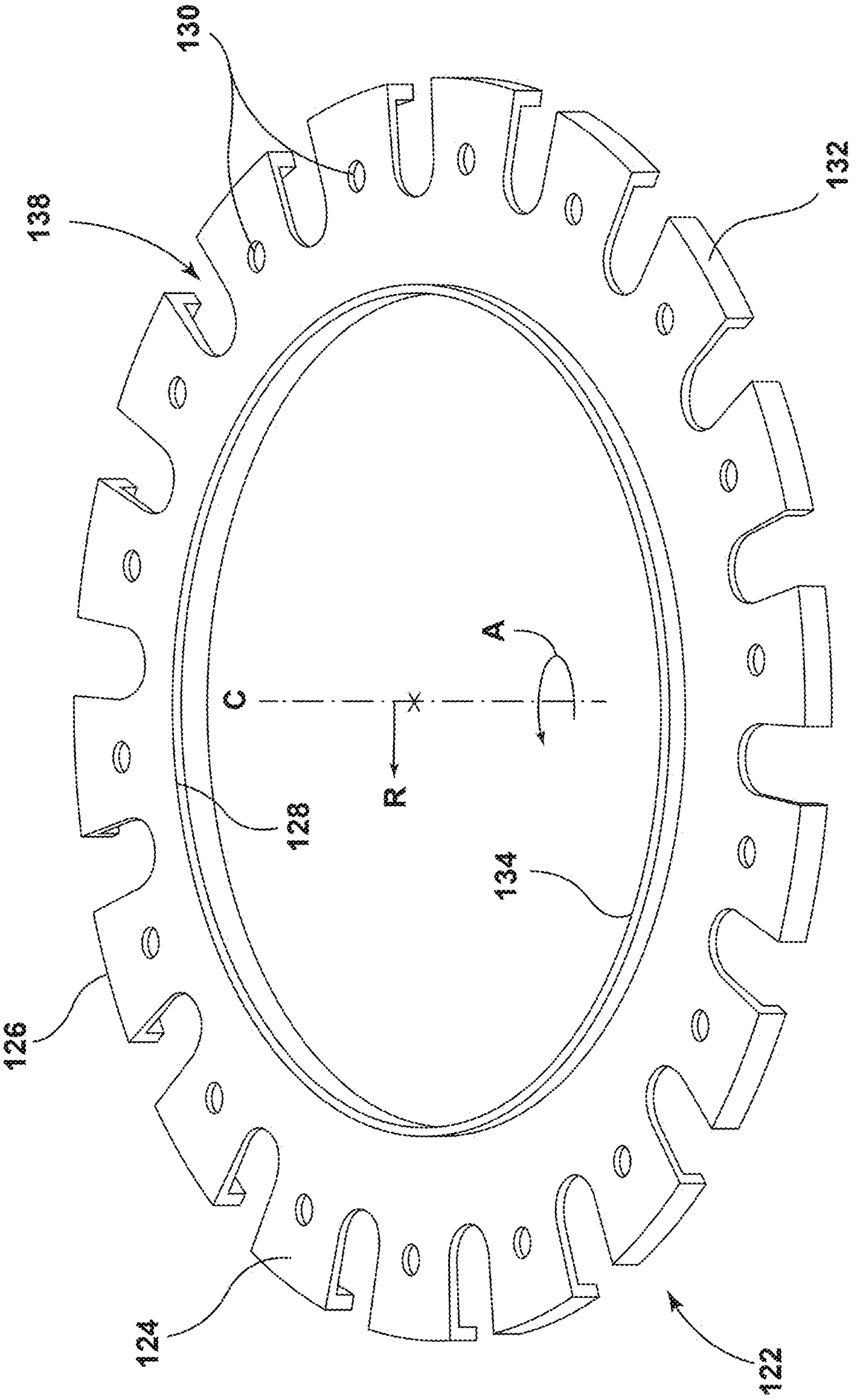
FIG. 5 is a perspective view of an adapter in accordance with various aspects of the present disclosure.

Referring now to FIG. 5, a perspective view of an adapter 122 in accordance with various aspects of the present disclosure is illustrated. As described above, the adapter 122 may define a scalloped configuration. As illustrated, the plurality of cutouts 138 may interrupt the continuity of the first rabbet 132 about the first section 126. In this way, the first rabbet 132 may extend from the first section 126 on portions of the adapter 122 in which there is no plurality of cutouts 138.

It should be noted that the plurality of cutouts 138 of the scalloped configuration may extend any length inward from the outermost portion, such as at least 5 centimeters and at most 500 centimeters. In various cases, the plurality of cutouts 138 may extend inwardly at any suitable length to ensure the proper operation of the gas turbine engine 10. In some cases, each of the plurality of cutouts 138 of the first flange 106, the second flange 114, and the adapter 122 may have the same shape to allow for the aligned configuration, as noted above. In other cases, the plurality of cutouts 138 of each of the components may extend radially inward at different lengths, resulting in a non-aligned configuration. In various cases, each of the plurality of cutouts 138 defined by the first component 105, the second component 113, and the adapter 122 may extend radially inward at any suitable length to ensure the operation of the connection assembly 104.

Figure 6:
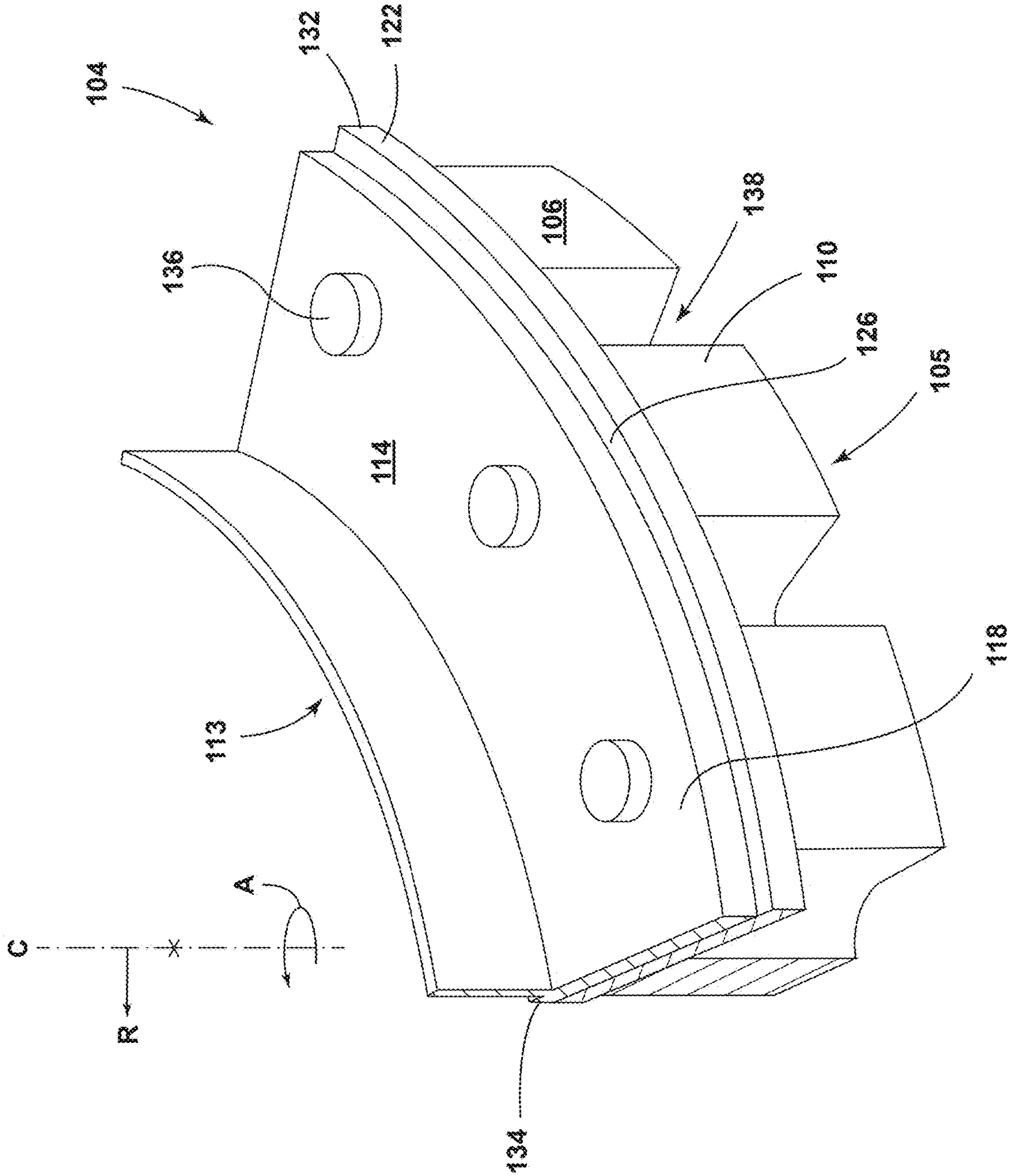
FIG. 6 is a perspective view of a connection assembly in accordance with various aspects of the present disclosure.

Referring now to FIG. 6, a perspective view of a connection assembly 104 in accordance with various aspects of the present disclosure is illustrated. As depicted, the first flange 106 may have a scalloped configuration, and the adapter 122 and the second flange 114 may have a non-scalloped configuration. In this way, the first portion 110 of the first component 105 may contact the first rabbet 132 on the portions of the first flange 106 in which there is no plurality of cutouts 138, wherein the first rabbet 132 extends about the first component 105 in the annular direction A. More specifically, the first rabbet 132 extends over each of the plurality of cutouts 138 in such a way that the first rabbet 132 extends from one end to the other of each of the plurality of cutouts 138.

Figure 7:
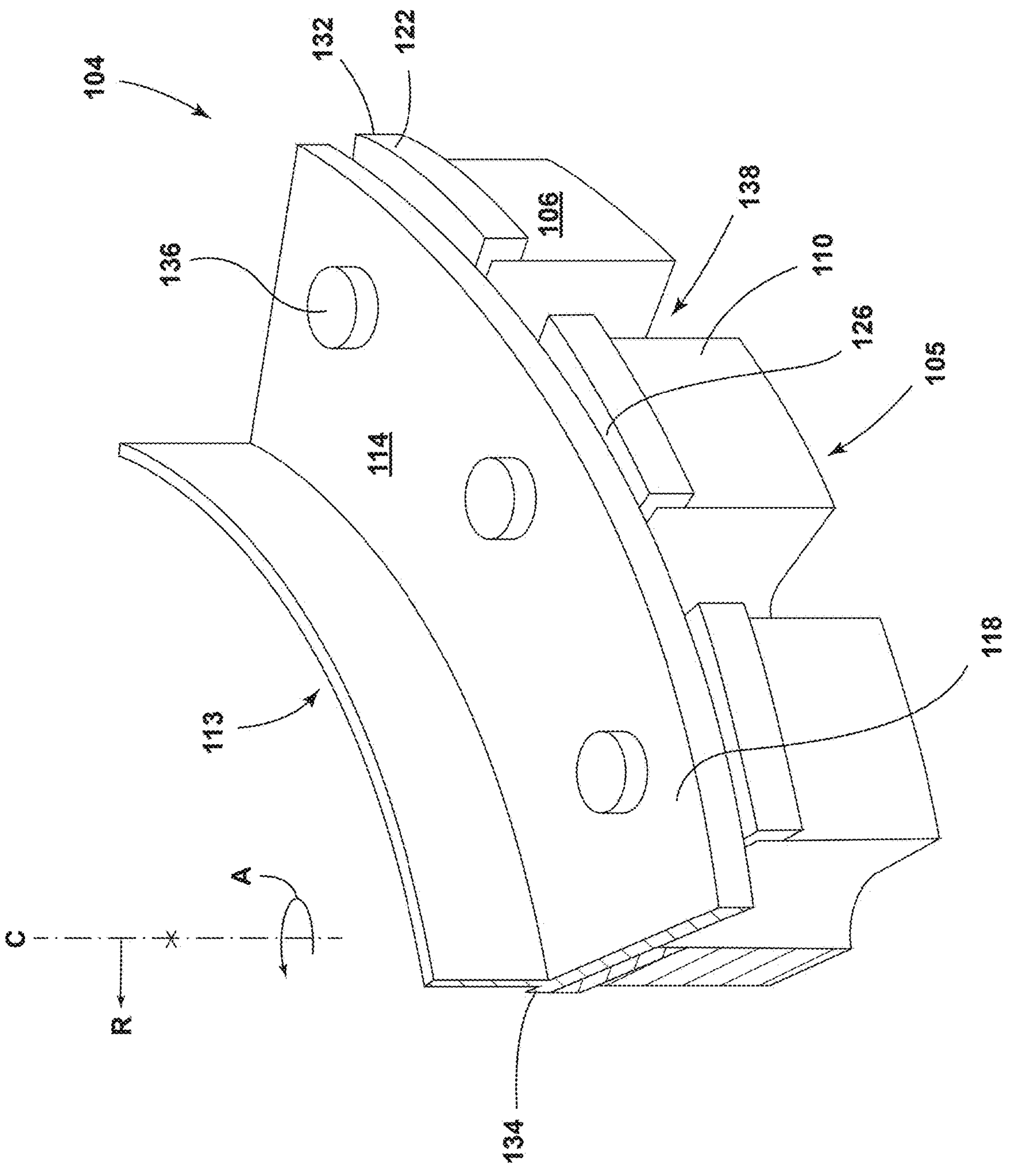
FIG. 7 is a perspective view of a connection assembly in accordance with various aspects of the present disclosure.

Referring now to FIG. 7, a perspective view of a connection assembly 104 in accordance with various aspects of the present disclosure is illustrated. As depicted, the first flange 106 and the adapter 122 may have a scalloped configuration, and the second flange 114 may have a non-scalloped configuration. Further, the scalloped configuration of the first flange 106 and the adapter 122 may align in such a way that each of the plurality of cutouts 138 are aligned along the connection assembly centerline C and in contact with one another.

Moreover, the connection assembly 104 may include any suitable arrangement to provide a coupling mechanism between any component and a portion of the gas turbine engine 10. In some cases, the connection assembly 104 may further include an O-ring or seal between any of the first flange 106 and the adapter 122, the second flange 114 and the adapter 122, or both. In various cases, the connection assembly 104 may be arranged in any suitable manner as appreciated by those of ordinary skill in the art.

During operation in some cases, particularly in cases in which the adapter does not extend continuously 360 degrees about the connection assembly centerline C, such as in a segmented arrangement, the entire radially outward force may be transferred through the adapter. For example, at least one segment of the adapter 122 may transfer the entirety of the radially outward force imposed by the first flange onto the first rabbet to the second flange through the second rabbet.

Figure 8:
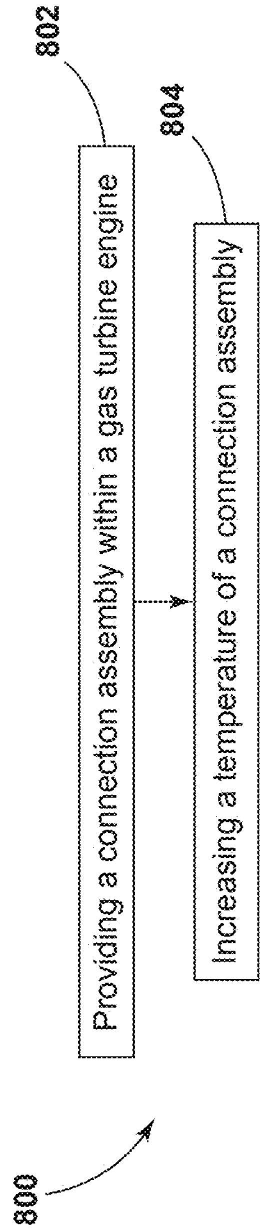
FIG. 8 illustrates a flow diagram of a method of retaining a connection assembly in accordance with various aspects of the present disclosure.

Referring now to FIG. 8, the diagram of a method of retaining a connection assembly in accordance with various aspects of the present disclosure is provided. In general, the method will be described herein with reference to the gas turbine engine 10 and the connection assembly described in reference to FIGS. 2A-7. However, it will be appreciated by those of ordinary skill in the art that the disclosed method may generally be utilized with any suitable connection assembly configuration. In addition, although FIG. 8 depicts the steps performed in a particular order for purposes of illustration and discussion, the methods discussed herein are not limited to any particular order or arrangement. One skilled in the art, using the disclosures provided herein, will appreciate the various steps of the methods disclosed herein can be omitted, rearranged, combined, and/or adapted in various ways without departing from the scope of the present disclosure.

At step 802, the method 800 may include providing a connection assembly within a gas turbine engine. The connection assembly may operably couple a first component, an adapter, and a second component. The first component may define a first flange and may have a first coefficient of thermal expansion. The second component may define a second flange and may have a second coefficient of thermal expansion. The adapter may include an adapter body, a first rabbet, and a second rabbit. The adapter may have a third coefficient of thermal expansion. The first coefficient of thermal expansion may be greater than the third coefficient of thermal expansion. Additionally or alternatively, the third coefficient of thermal expansion may be greater than the second coefficient of thermal expansion At step 804, the method may include increasing a temperature of a connection assembly, which imparts a radially outward force through expansion of the first flange onto the adapter through a first rabbet and transfers at least a portion of the radially outward force to the second flange via the adapter and a second rabbet. As described above, the gas turbine engine may warm up during operation. In doing so, the components within the gas turbine engine may be thermally heated, including the connection assembly. For example, the heat from the gas turbine engine may thermally heat the connection assembly, including the first component and a second component. Further, the first component may have a first coefficient of thermal expansion, and the second component may have a second coefficient of thermal expansion. Generally, the connection assembly may be thermally connected to at least a portion of the gas turbine engine that may become heated during the operation of the gas turbine engine, such as an engine frame, structure, gearbox, or accessory. The first component and the second component may each define any one of the engine frame, structure, gearbox, accessories, and/or any other component. Moreover, the first component may define a first flange, and the second component may define a second flange. The first flange and the second flange may be incorporated into the connection assembly and may be mechanically coupled to one another.

Further aspects are provided by the subject matter of the following clauses:

A gas turbine engine including a connection assembly, the connection assembly comprising: a first component of the gas turbine engine defining a first flange, the first component of the gas turbine engine having a first coefficient of thermal expansion; a second component of the gas turbine engine defining a second flange, the second component having a second coefficient of thermal expansion; an adapter comprising an adapter body, a first rabbet, and a second rabbet, the adapter positioned between the first component and the second component, the adapter having a third coefficient of thermal expansion, wherein the first coefficient of thermal expansion is greater than the third coefficient of thermal expansion, and wherein the third coefficient of thermal expansion is greater than the second coefficient of thermal expansion; and a fastener configured to retain the first component, the adapter, and the second component relative to one another along a connection assembly centerline.

The gas turbine engine of any preceding clause, wherein the first flange further comprises: a first portion and a second portion, wherein the first rabbet contacts the first portion.

The gas turbine engine of any preceding clause, wherein the second flange further comprises: a first segment and a second segment, wherein the second rabbet contacts the second segment.

The gas turbine engine of any preceding clause, wherein the first flange defines a scalloped configuration.

The gas turbine engine of any preceding clause, wherein the adapter defines a scalloped configuration.

The gas turbine engine of any preceding clause, wherein the second flange defines a scalloped configuration.

The gas turbine engine of any preceding clause, wherein each of the first flange, the second flange, and the adapter are aligned and in contact with one another.

The gas turbine engine of any preceding clause, wherein each of the first flange, the second flange, and the adapter each define a plurality of holes, and wherein the plurality of holes of the first flange, the second flange, and the adapter are aligned to form a fastener channel.

The gas turbine engine of any preceding clause, wherein the fastener is configured as a bolt, wherein the bolt mechanically couples the first flange, the second flange, and the adapter to one another.

The gas turbine engine of any preceding clause, wherein the adapter defines a hook configuration comprising a plurality of cutouts, and wherein the fastener extends through each of the plurality of cutouts.

A method of retaining a connection assembly, the method comprising providing a connection assembly within a gas turbine engine, the connection assembly operably coupling a first component, an adapter, and a second component, the first component defining a first flange and having a first coefficient of thermal expansion, the second component defining a second flange and having a second coefficient of thermal expansion, and the adapter including an adapter body, a first rabbet, and a second rabbit, the adapter having a third coefficient of thermal expansion, wherein the first coefficient of thermal expansion is greater than the third coefficient of thermal expansion, and wherein the third coefficient of thermal expansion is greater than the second coefficient of thermal expansion; and increasing a temperature of a connection assembly thereby imparting a radially outward force through expansion of the first flange onto the adapter through a first rabbet and transferring at least a portion of the radially outward force to the second flange via the adapter and a second rabbet.

The method of any preceding clause, wherein imparting the radially outward force through the expansion of the first flange onto the adapter through the first rabbet further comprises: expanding the adapter at a slower rate than the first flange based on the difference between the first coefficient of thermal expansion and the third coefficient of thermal expansion.

The method of any preceding clause, wherein transferring at least the portion of the radially outward force to the second flange via the adapter and the second rabbet, wherein the third coefficient of thermal expansion is greater than the second coefficient of thermal expansion, further comprises: expanding the second flange at a slower rate than both the adapter and the first flange based on the difference between the second coefficient of thermal expansion and the third coefficient of thermal expansion.

The method of any preceding clause, wherein transferring at least the portion of the radially outward force to the second flange via the adapter and the second rabbet, wherein the third coefficient of thermal expansion is greater than the second coefficient of thermal expansion, further comprises: reducing a stress proximate to at least one hole defined through the second flange and a fastener positioned through the at least one hole.

The method of any preceding clause, wherein transferring at least the portion of the radially outward force to the second flange via the adapter and the second rabbet, wherein the third coefficient of thermal expansion is greater than the second coefficient of thermal expansion, further comprises: reducing sliding between the adapter and the second flange.

A connection assembly comprising: a first component defining a first flange, the first component having a first coefficient of thermal expansion; a second component defining a second flange, the second component having a second coefficient of thermal expansion; a fastener; and an adapter comprising an adapter body, a first rabbet, and a second rabbet, the adapter having a third coefficient of thermal expansion, wherein the first coefficient of thermal expansion is greater than the third coefficient of expansion, and wherein the third coefficient of expansion is greater than the second coefficient of expansion.

The connection assembly of any preceding clause, wherein the first flange further comprises a first portion and a second portion, wherein the first rabbet contacts the first portion.

The connection assembly of any preceding clause, wherein the second flange further comprises a first segment and a second segment, wherein the second rabbet contacts the second segment.

The connection assembly of any preceding clause, wherein each of the first flange, the second flange, and the adapter each define a plurality of holes, and wherein the plurality of holes defined by the first flange, the second flange, and the adapter are aligned along a connection assembly centerline.

The connection assembly of any preceding clause, wherein the fastener includes a plurality of bolts, and wherein the plurality of bolts may be configured to mechanically couple the first flange, the second flange, and the adapter.

This written description uses examples to disclose the present disclosure, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A gas turbine engine including a connection assembly, the connection assembly comprising:

a first component of the gas turbine engine defining a first flange, the first component having a first coefficient of thermal expansion;

a second component of the gas turbine engine defining a second flange, the second component having a second coefficient of thermal expansion;

an adapter comprising an adapter body, a first rabbet, and a second rabbet, the adapter positioned between the first component and the second component, the adapter having a third coefficient of thermal expansion, wherein the first coefficient of thermal expansion is greater than the third coefficient of thermal expansion, and wherein the third coefficient of thermal expansion is greater than the second coefficient of thermal expansion; and a fastener retaining the first component, the adapter, and the second component relative to one another along a connection assembly centerline.

2. The gas turbine engine of claim 1, wherein the first flange further comprises:

a first portion and a second portion, wherein the first rabbet contacts the first portion.

3. The gas turbine engine of claim 1, wherein the second flange further comprises:

a first segment and a second segment, wherein the second rabbet contacts the second segment.

4. The gas turbine engine of claim 1, wherein the first flange defines a scalloped configuration.

5. The gas turbine engine of claim 4, wherein the adapter defines a scalloped configuration.

6. The gas turbine engine of claim 5, wherein the second flange defines a scalloped configuration.

7. The gas turbine engine of claim 6, wherein each of the first flange, the second flange, and the adapter are aligned and in contact with one another.

8. The gas turbine engine of claim 1, wherein each of the first flange, the second flange, and the adapter each define a plurality of holes, and wherein the plurality of holes of the first flange, the second flange, and the adapter are aligned to form a fastener channel.

9. The gas turbine engine of claim 8, wherein the fastener is configured as a bolt, wherein the bolt mechanically couples the first flange, the second flange, and the adapter to one another.

10. The gas turbine engine of claim 1, wherein the adapter defines a hook configuration comprising a plurality of cutouts, and wherein the fastener extends through each of the plurality of cutouts.

11. A method of retaining a connection assembly, the method comprising:

providing a connection assembly within a gas turbine engine, the connection assembly operably coupling a first component, an adapter, and a second component, the first component defining a first flange and having a first coefficient of thermal expansion, the second component defining a second flange and having a second coefficient of thermal expansion, and the adapter including an adapter body, a first rabbet, and a second rabbet, the adapter having a third coefficient of thermal expansion, wherein the first coefficient of thermal expansion is greater than the third coefficient of thermal expansion, and wherein the third coefficient of thermal expansion is greater than the second coefficient of thermal expansion; and increasing a temperature of the connection assembly, thereby imparting a radially outward force through expansion of the first flange onto the adapter through the first rabbet and transferring at least a portion of the radially outward force to the second flange via the adapter and the second rabbet.

12. The method of claim 11, wherein imparting the radially outward force through the expansion of the first flange onto the adapter through the first rabbet further comprises:

expanding the adapter at a slower rate than the first flange based on a difference between the first coefficient of thermal expansion and the third coefficient of thermal expansion.

13. The method of claim 11, wherein transferring at least the portion of the radially outward force to the second flange via the adapter and the second rabbet, wherein the third coefficient of thermal expansion is greater than the second coefficient of thermal expansion, further comprises:

expanding the second flange at a slower rate than both the adapter and the first flange based on a difference between the second coefficient of thermal expansion and the third coefficient of thermal expansion.

14. The method of claim 11, wherein transferring at least the portion of the radially outward force to the second flange via the adapter and the second rabbet, wherein the third coefficient of thermal expansion is greater than the second coefficient of thermal expansion, further comprises:

reducing a stress proximate to at least one hole defined through the second flange and a fastener positioned through the at least one hole.

15. The method of claim 14, wherein transferring at least the portion of the radially outward force to the second flange via the adapter and the second rabbet, wherein the third coefficient of thermal expansion is greater than the second coefficient of thermal expansion, further comprises:

reducing sliding between the adapter and the second flange.

16. A connection assembly comprising:

a first component defining a first flange, the first component having a first coefficient of thermal expansion;

a second component defining a second flange, the second component having a second coefficient of thermal expansion;

a fastener; and an adapter comprising an adapter body, a first rabbet, and a second rabbet, the adapter having a third coefficient of thermal expansion, wherein the first coefficient of thermal expansion is greater than the third coefficient of expansion, and wherein the third coefficient of expansion is greater than the second coefficient of expansion.

17. The connection assembly of claim 16, wherein the first flange further comprises a first portion and a second portion, wherein the first rabbet contacts the first portion.

18. The connection assembly of claim 17, wherein the second flange further comprises a first segment and a second segment, wherein the second rabbet contacts the second segment.

19. The connection assembly of claim 16, wherein each of the first flange, the second flange, and the adapter each define a plurality of holes, and wherein the plurality of holes defined by of the first flange, the second flange, and the adapter are aligned along a connection assembly centerline.

20. The connection assembly of claim 19, wherein the fastener includes a plurality of bolts, and wherein the plurality of bolts may be configured to mechanically couple the first flange, the second flange, and the adapter.

* * * * *